United States Patent
Freitag et al.

(10) Patent No.: US 12,007,878 B2
(45) Date of Patent: Jun. 11, 2024

(54) TESTING AND DEPLOYING TARGETED VERSIONS OF APPLICATION LIBRARIES WITHIN A SOFTWARE APPLICATION

(71) Applicant: FMR LLC, Boston, MA (US)

(72) Inventors: Jon Freitag, Chapel Hill, NC (US);
Fatih Ergin, Holly Springs, NC (US);
Ravi Shankar, Bengaluru (IN);
Pogachetla Amjad Ahamed, Chittoor (IN)

(73) Assignee: FMR LLC, Boston, MA (US)

( * ) Notice: Subject to any disclaimer, the term of this patent is extended or adjusted under 35 U.S.C. 154(b) by 112 days.

(21) Appl. No.: 17/713,459

(22) Filed: Apr. 5, 2022

(65) Prior Publication Data

US 2023/0315614 A1 Oct. 5, 2023

(51) Int. Cl.
*G06F 11/36* (2006.01)
*G06F 8/65* (2018.01)
*G06F 9/455* (2018.01)

(52) U.S. Cl.
CPC .......... *G06F 11/368* (2013.01); *G06F 8/65* (2013.01); *G06F 9/45558* (2013.01); *G06F 11/3616* (2013.01); *G06F 11/3688* (2013.01); *G06F 2009/4557* (2013.01); *G06F 2009/45583* (2013.01)

(58) Field of Classification Search
CPC .......... G06F 11/368; G06F 11/3688; G06F 11/3616; G06F 9/45558; G06F 2009/4557; G06F 2009/45583
See application file for complete search history.

(56) References Cited

U.S. PATENT DOCUMENTS 10,289,400 B2 5/2019 De Zaeytijd et al.
10,437,568 B1* 10/2019 Yu .................. G06F 16/9577
(Continued)

OTHER PUBLICATIONS

Foo, Darius, et al., Efficient static checking of library updates, Proceedings of ESEC/FSE 2018, Oct. 2018, 6 pages, [retrieved on Feb. 7, 2024], Retrieved from the Internet: <URL:http://dl.acm.org/>.*

(Continued)

*Primary Examiner* — Geoffrey R St Leger
(74) *Attorney, Agent, or Firm* — Cesari & McKenna, LLP (57) ABSTRACT

Methods and apparatuses are described for testing and deploying targeted versions of application libraries within a software application. A computing device selects a software application comprising application libraries each associated with a current version identifier. The computing device identifies a target version of one or more application libraries, the target version associated with a different version identifier than the current identifier. The computing device defines a software application build for the software application incorporating the identified target versions of the application libraries, and deploys the application build to a test computing environment. The computing device executes tests of the software application build in the test environment, and captures test execution data for the target versions of the libraries in the software application build. The computing device deploys the software application build including the target versions of the application libraries to a production computing environment based upon the test execution data.

18 Claims, 6 Drawing Sheets

(56) References Cited

U.S. PATENT DOCUMENTS

| | | |
|---|---|---|
| 10,678,513 B2 | 6/2020 | Kadam et al. |
| 11,714,745 B1* | 8/2023 | Chauhan .................. G06F 9/52 717/124 |
| 2015/0363197 A1 | 12/2015 | Carback, III et al. |
| 2020/0202007 A1* | 6/2020 | Nagaraja ............. G06F 11/3684 |
| 2020/0356681 A1* | 11/2020 | Sun ....................... G06F 21/604 |

OTHER PUBLICATIONS

Kalra, Sukrit, et al., Pollux safely upgrading dependent application libraries, FSE 2016: Proceedings of the 2016 24th ACM SIGSOFT International Symposium on Foundations of Software Engineering, Nov. 2016, 11 pages, [retrieved on Feb. 7, 2024], Retrieved from the Internet: <URL:http://dl.acm.org/>.*

* cited by examiner

TESTING AND DEPLOYING TARGETED VERSIONS OF APPLICATION LIBRARIES WITHIN A SOFTWARE APPLICATION

TECHNICAL FIELD

This application relates generally to methods and apparatuses, including computer program products, for testing and deploying targeted versions of application libraries within a software application.

BACKGROUND

Due to the flexibility, re-usability, and cost of open source and/or third-party software modules, artifacts, and libraries, developers now frequently incorporate such software into their applications, either directly or as application dependencies—and many of these modules, artifacts, and libraries are publicly available for download and use without restriction. For example, a typical web application may use on the order of thirty to fifty third-party libraries to accomplish various lower level program functions. As can be appreciated, these libraries may need to be periodically upgraded for various reasons, including availability of new features, resolving functional issues, security issues, and end of life/support considerations.

Upgrading and/or updating applications and their associated artifacts and libraries can be a time-consuming process that typically involves determining one or more versions of a library to use, updating third-party libraries with the determined version(s), generating a new application build, deploying to one or more testing or production environments and performing functional and performance-related tests to ensure the libraries are working properly within the application and do not impose any risks of data loss or security deficiencies. Generally, existing development systems that provide for updating of libraries approach the problem as requiring specific identification of each upgraded library version by a developer or system administrator. This approach can be time-consuming and cumbersome, requiring the developer or system administrator to individually determine, select and test each upgrade for every library being used—even when a plurality of libraries may have common characteristics that could be updated according to the same technical considerations.

SUMMARY

Therefore, what is needed are methods and systems that enable the automatic execution of library version deployment scenarios based upon one or more characteristics associated with the libraries being upgraded, such as end-of-life attributes, critical vulnerabilities, deprecation or dependency characteristics and the like. The techniques described herein advantageously provide for the automated identification of upgraded library versions for multiple libraries in a given application, integration of the upgraded libraries into a software application build, deployment of the software application build to a test computing environment, and execution of the deployed build to identify issues or errors resulting from use of the upgraded libraries. These techniques beneficially allow for technical staff to quickly select libraries for upgrading and determine whether to deploy such libraries to a production build based upon the testing results, without having to conduct a separate test for each library and integrate them individually into a particular software application build. The methods and systems described herein further provide an intuitive front-end user interface for developers to manage the library upgrade process for one or more applications without the need to manually generate complex scripts or build instructions for the library upgrades.

The invention, in one aspect, features a system for testing and deploying targeted versions of application libraries within a software application. The system comprises a computing device with a memory for storing computer-executable instructions and a processor that executes the computer-executable instructions to select a software application comprising one or more application libraries each associated with a current version identifier. The computing device identifies a target version of one or more of the application libraries, the target version associated with a different version identifier than the current version identifier. The computing device defines a software application build for the software application, the software application build incorporating the identified target versions of the application libraries. The computing device deploys the software application build to a test computing environment. The computing device executes one or more tests of the software application build in the test computing environment. The computing device captures test execution data for one or more target versions of the application libraries in the software application build. The computing device deploys the software application build including the target versions of the application libraries to a production computing environment based upon the test execution data.

The invention, in another aspect, features a computerized method of testing and deploying targeted versions of application libraries within a software application. A computing device selects a software application comprising one or more application libraries each associated with a current version identifier. The computing device identifies a target version of one or more of the application libraries, the target version associated with a different version identifier than the current version identifier. The computing device defines a software application build for the software application, the software application build incorporating the identified target versions of the application libraries. The computing device deploys the software application build to a test computing environment. The computing device executes one or more tests of the software application build in the test computing environment. The computing device captures test execution data for one or more target versions of the application libraries in the software application build. The computing device deploys the software application build including the target versions of the application libraries to a production computing environment based upon the test execution data.

Any of the above aspects can include one or more of the following features. In some embodiments, identifying a target version of one or more of the application libraries comprises receiving, from a remote computing device, a selection of the target version of the application library and retrieving, from a library database, the target version of the application library for use in the software application build based upon the selection. In some embodiments, identifying a target version of one or more of the application libraries comprises generating one or more target version scenarios for display on the remote computing device, each target version scenario comprising a definition of which target version of the application library to include in the software application build; receiving a selection of one of the target version scenarios from the remote computing device; and retrieving, from a library database, the target version of the application library for use in the software application build based upon the attribute in the selected target version scenario.

In some embodiments, generating one or more target version scenarios comprises determining one or more common attributes for a plurality of application libraries; and generating the target version scenarios based upon the common attributes. In some embodiments, the common attributes comprise an end of life attribute, a critical vulnerability attribute, a deprecation attribute, or a dependency attribute. In some embodiments, the definition of which target version to include in the software application build comprises a latest version of the application library, a latest sub-version of the application library, or a latest version of the application library with no critical vulnerabilities.

In some embodiments, the test execution data comprises an error generated by one or more of the target versions of the application libraries in the software application build, a missing data value generated by one or more of the target versions of the application libraries in the software application build, or a test failure message generated by one or more of the target versions of the application libraries in the software application build. In some embodiments, deploying the software application build including the target versions of the application libraries to a production computing environment based upon the test execution data comprises determining that one or more of the tests had successful execution for the software application build in the test computing environment.

In some embodiments, the computing device determines that one or more of the tests did not have successful execution for the software application build in the test computing environment and reverses deployment of the software application build including the target versions of the application libraries to the production computing environment. In some embodiments, deploying the software application build to a test computing environment comprises provisioning the test computing environment, including initializing one or more virtual machines for execution of the software application build. In some embodiments, the computing device tears down the test computing environment upon conclusion of the test execution and results capture.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
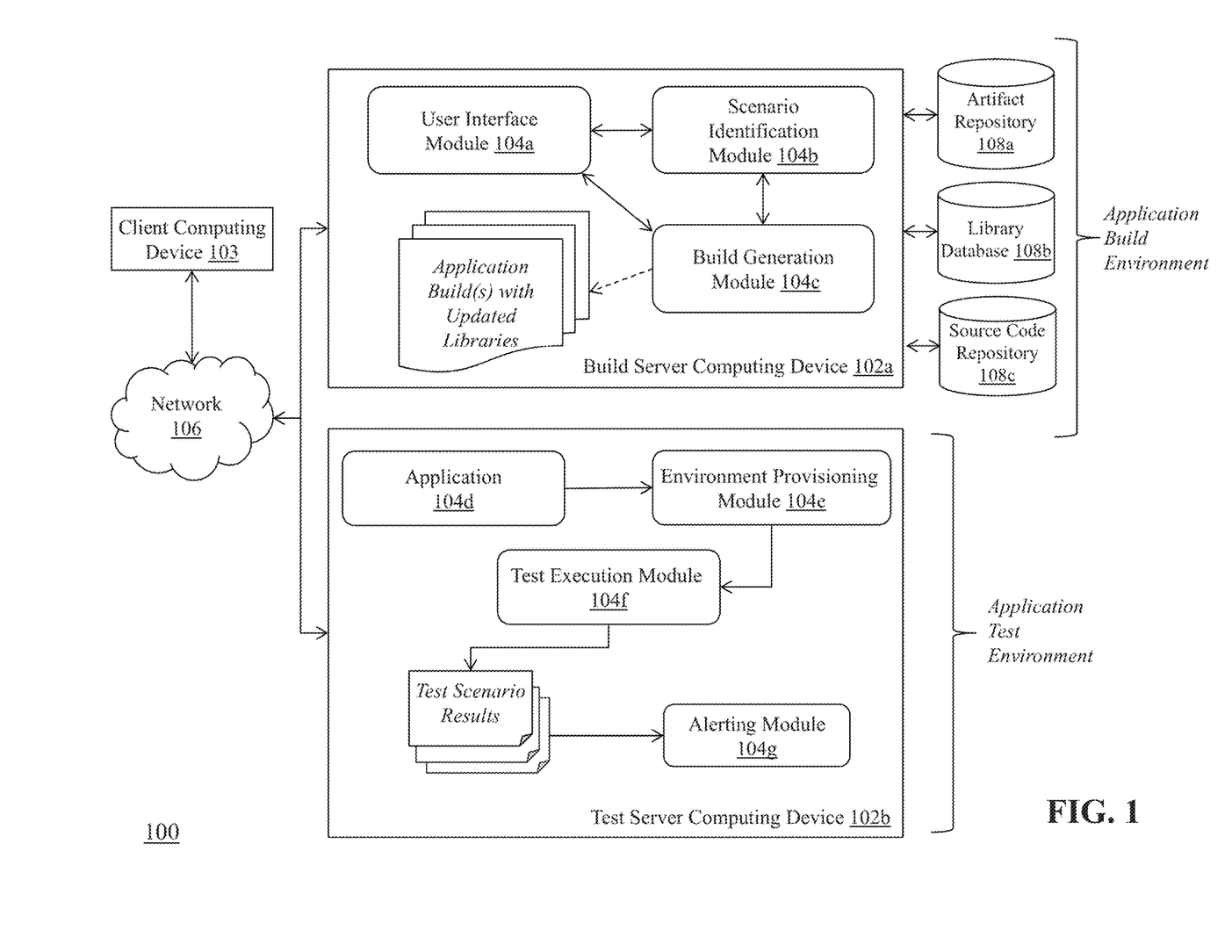
FIG. 1 is a block diagram of a system for testing and deploying targeted versions of application libraries within a software application.

FIG. 1 is a block diagram of a system 100 for testing and deploying targeted versions of application libraries within a software application. The system 100 includes an application build environment that comprises a build server computing device 102a that includes a user interface module 104a, a scenario identification module 104b, a build generation module 104c, and a plurality of databases—artifact repository 108a, library database 108b, and source code repository 108c. The system further includes an application test environment that is coupled to the application build environment via a communications network 106. The application test environment comprises a server computing device 102b that includes an application 104d, an environment provisioning module 104e, a test execution module 104f, and an alerting module 108e. The build server computing device 102a and the test server computing device 102b are each coupled to the client computing device 103 via network 106.

The build server computing device 102a connects to the communications network 104 in order to communicate with the test server computing device 102b and the client computing device 103 to perform functions relating to testing and deploying targeted versions of application libraries within a software application. In some embodiments, the build server 102a is a combination of hardware, including one or more special-purpose processors and one or more physical memory modules, and specialized software modules—including user interface module 104a, scenario identification module 104b, and build generation module 104c—that are executed by a processor of the build server 102a, to receive data from other components of the system 100, transmit data to other components of the system 100, and perform functions relating to testing and deploying targeted versions of application libraries within a software application as described herein It should be appreciated that other types of computing devices that are capable of connecting to the components of the system 100 can be used without departing from the scope of invention. Although FIG. 1 depicts a single build server 102a, it should be appreciated that the system 100 can include any number of build servers. In some embodiments, the build server 102a is associated with a source code change management platform, software application development platform, and/or an issue tracking platform (such as Jira™ from Atlassian, Inc.), and the build server 102a is configured to coordinate with test server computing device 102b to generate a software application build and deploy the software application build in the application test environment as described herein.

The test server computing device 102b connects to the communications network 104 in order to communicate with the build server computing device 102a and the client computing device 103 to perform functions relating to testing and deploying targeted versions of application libraries within a software application. In some embodiments, the test server 102b is a combination of hardware, including one or more special-purpose processors and one or more physical memory modules, and specialized software modules—including application 104d, environment provisioning module 104e, test execution module 104f, and alerting module 104g—that are executed by a processor of the test server 102b, to receive data from other components of the system 100, transmit data to other components of the system 100, and perform functions relating to testing and deploying targeted versions of application libraries within a software application as described herein It should be appreciated that other types of computing devices that are capable of connecting to the components of the system 100 can be used without departing from the scope of invention. Although FIG. 1 depicts a single test server 102b, it should be appreciated that the system 100 can include any number of test servers. In some embodiments, the test server 102b is associated with an automation testing software platform or tool (such as Selenium™ available from selenium.dev or Sahi™ Pro available from sahipro.com), and the test server 102b is configured to coordinate with build server computing device 102a to provision the application test environment, deploy a software application build in the application test environment, execute tests against the software application build, and capture test results associated with the test execution as described herein.

The client computing device 103 connects to the communications network 104 in order to communicate with the build server computing device 102a and the test server computing device 102b to perform functions relating to testing and deploying targeted versions of application libraries within a software application. Exemplary client computing devices 103 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client computing device 103, it should be appreciated that the system 100 can include any number of client computing devices.

The communication network 106 enables the other components of the system 100 to communicate with each other in order to perform the process of detecting vulnerabilities associated with a software application build as described herein. The network 106 may be a local network, such as a LAN, or a wide area network, such as the Internet and/or a cellular network. In some embodiments, the network 106 is comprised of several discrete networks and/or sub-networks (e.g., cellular to Internet) that enable the components of the system 100 to communicate with each other. In some embodiments, a network that connects the build server 102a to the test server 102b is different from a network that connects the client computing device 103 to the build server 102a and/or test server 102b The server computing devices 102a and 102b are each a combination of hardware, including one or more special-purpose processors and one or more physical memory modules, and specialized software modules—such as modules 104a-104c for server 102a, and modules 104d-104g for server 102b—that are executed by a processor of the respective server computing device 102a and 102b, to receive data from other components of the system 100, transmit data to other components of the system 100, and perform functions for testing and deploying targeted versions of application libraries within a software application as described herein. In some embodiments, the modules 104a-104g are specialized sets of computer software instructions programmed onto a dedicated processor in the respective server computing device 102a or 102b and can include specifically-designated memory locations and/or registers for executing the specialized computer software instructions. Further explanation of the specific processing performed by the modules 104a-104g will be provided below.

Although the modules 104a-104c are shown in FIG. 1 as executing within the same server computing device 102a, and modules 104d-104g are shown as executing within the same server computing device 102b, in some embodiments the functionality of the modules 104a-104g can be distributed among a plurality of server computing devices and/or located on the same computing device. As shown in FIG. 1, the server computing device 102a enables the modules 104a-104c to communicate with each other in order to exchange data for the purpose of performing the described functions, and similarly the server computing device 102b enables the modules 104d-104g to communicate with each other in order to exchange data for the purpose of performing the described functions. It should be appreciated that any number of computing devices, arranged in a variety of architectures, resources, and configurations (e.g., cluster computing, virtual computing, cloud computing) to perform the functions of the server computing devices 102a and 102b.

The databases 108a-108c comprise transient and/or persistent memory for data storage, that is used in conjunction with testing and deploying targeted versions of application libraries within a software application as described herein. Generally, the databases 108a-108c are configured to receive, generate, and store specific segments of data relating to functions performed by the modules 104a-104g, the build server 102a and/or the test server 102b more generally, and/or the client computing device 103. In some embodiments, all or a portion of the databases 108a-108c can be integrated within the build server 102a, or located on a separate computing device or devices, where the separate devices are in proximity to the server computing device 102a (e.g., connected via cabling or other localized connection) and/or located via remote network connection (e.g., network 106) to the server computing device 102a. In one example, the databases 108a-108c can each comprise a database such as MySQL™ available from Oracle Corp. of Redwood City, California or MongoDB available at mongodb.com. In another example, the databases 110a-110c can be based upon a platform such as Cassandra™ available from The Apache Software Foundation (cassandra.apache.org). Other types of 'big data,' scalable databases and/or customized database frameworks can be used within the scope of the technology described herein.

Figure 2:
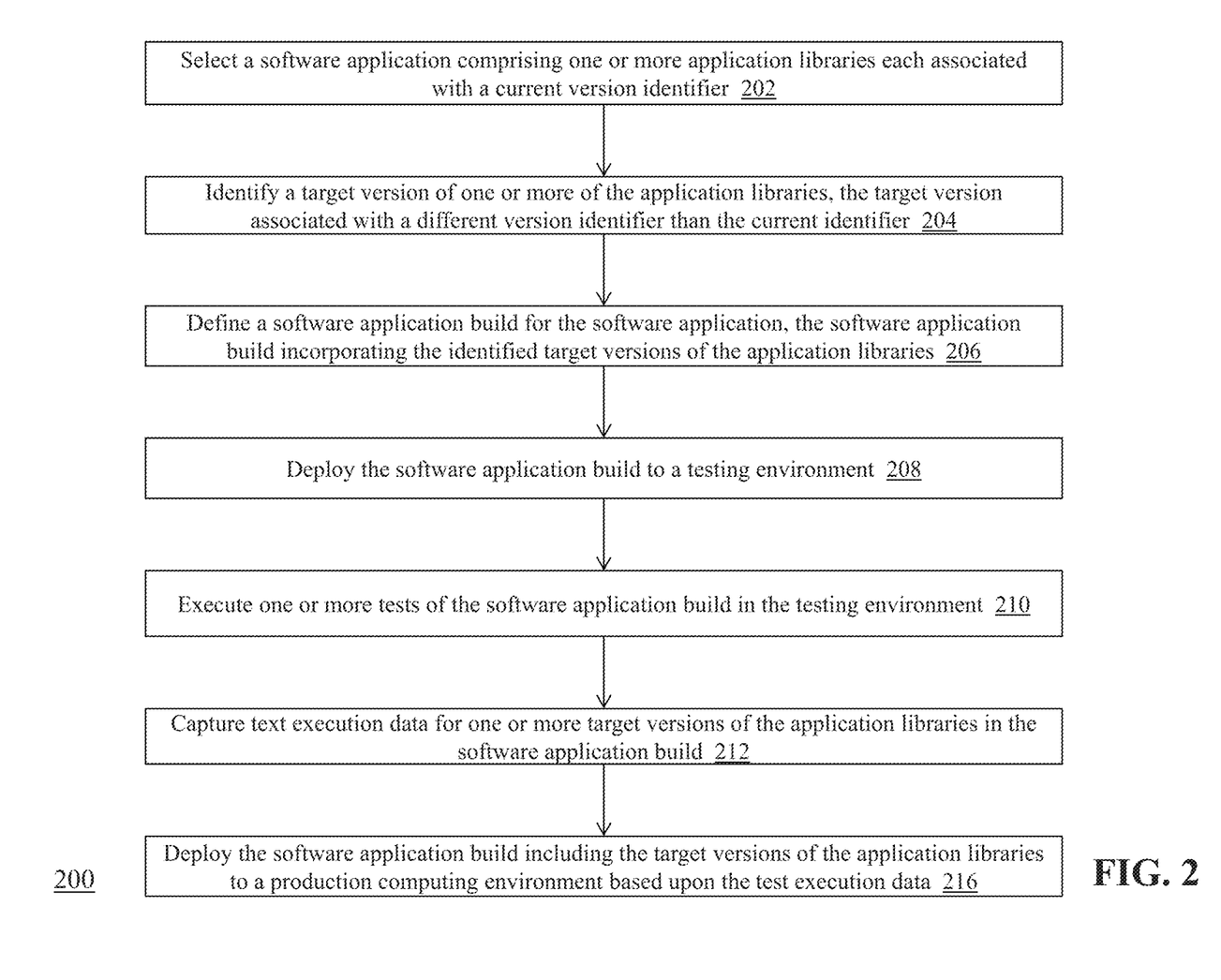
FIG. 2 is a flow diagram of a testing and deploying targeted versions of application libraries within a software application.
Figure 3:
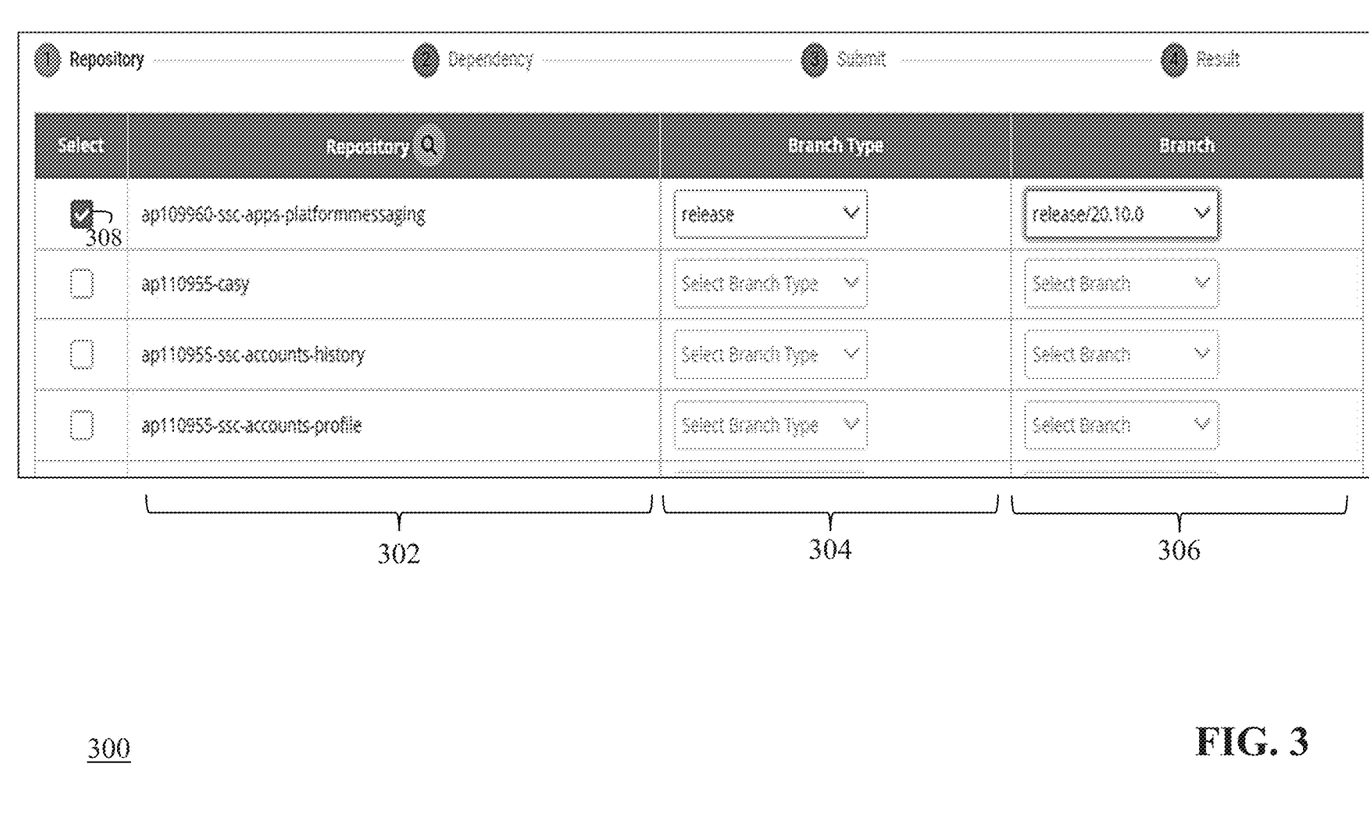
FIG. 3 is a diagram of an exemplary software application selection user interface as generated by the user interface (UI) module.

FIG. 2 is a flow diagram of a computerized method 200 of testing and deploying targeted versions of application libraries within a software application, using the system 100 of FIG. 1. The client computing device 103 connects to the user interface (UI) module 104a of build server 102a in order to initiate generation, deployment, and testing of a software application build that includes upgraded or updated libraries as described herein. The UI module 104a receives input from the client computing device 103 to select (step 202 of FIG. 2) a software application comprising one or more application libraries each associated with a current version identifier. The UI module 104a generates a user interface screen for display on the client computing device 103 that lists the software application projects/tech stacks that are available for modification and testing as described herein. FIG. 3 is a diagram of an exemplary software application selection user interface 300 as generated by the UI module 104a. As shown in FIG. 3, the user interface 300 includes a list of software application projects from which the user can select. In some embodiments, each item in the list is a software application project that corresponds to certain application functionality. For example, the first item in the list is a software application project with the identifier 'ap109960-ssc-apps-platformmessaging.' The list comprises the software application repository 302, a branch type 304 of the software application, and a branch identifier 306 of the software application. The user at client computing device 103 can select a specific branch of the software application code to be modified and tested using, e.g., the drop down boxes as shown in FIG. 3. In some embodiments, the UI module 104a retrieves the list of software applications from the source code repository 108c for generation of the user interface 300. To select a software application project, the user can click the empty box next to the desired project (e.g., box 308) to check the box and instruct the UI module 104a to go to the next screen (e.g., via a button or other user interface element, not shown).

Figure 4:
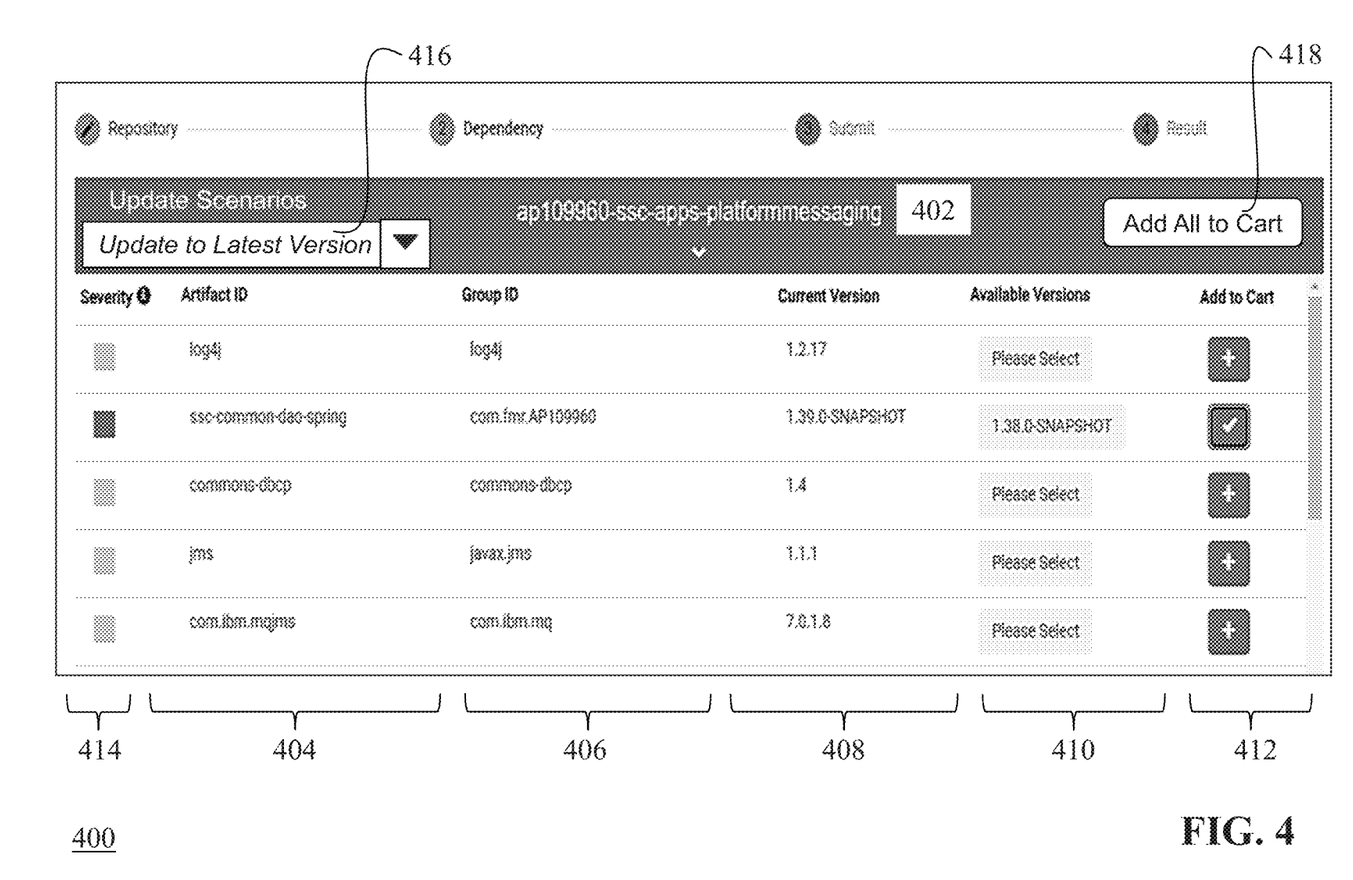
FIG. 4 is a diagram of an exemplary artifact selection user interface as generated by the UI module.

When one or more software application project selections are received from the client computing device 103, the user interface module 104a can retrieve an identification of application artifacts for the selected software application project(s) from, e.g., artifact repository 108a—such as data objects, dependencies, code modules, libraries and the like. The user interface module 104a generates a user interface screen for display on the client computing device 103 that lists the identified artifacts for the selected software application project, including any application libraries. FIG. 4 is a diagram of an exemplary artifact selection user interface 400 as generated by the UI module 104a. As shown in FIG. 4, the identifier for the selected software application project from FIG. 3 (i.e. 'ap109960-ssc-apps-platformmessaging') is displayed at the top of the user interface (as element 402). The user interface 400 includes a list of application artifacts, such as libraries and other dependencies, as retrieved from e.g., artifact repository 108a. The UI module 108a also displays certain metadata corresponding to each artifact that is currently integrated into the software application project: an artifact ID 404, a group ID, and a current version 408. For each artifact, the UI module 108a retrieves artifact version-specific metadata from, e.g., library database 108b for inclusion as the available versions element 410 in the user interface 400. As shown in FIG. 4, the available versions element 410 comprises a selectable feature that enables a user at client computing device 103 to review one or more available versions of the corresponding artifact and to select a specific artifact version to integrate into the software application build. As can be appreciated, the one or more available versions can include newer versions, previous versions, alternate versions, beta versions, and so forth. As an illustrative example, the library can be upgraded to a newer version or rolled back to a previous version depending upon the requirements of the testing and deployment process.

Figure 5:
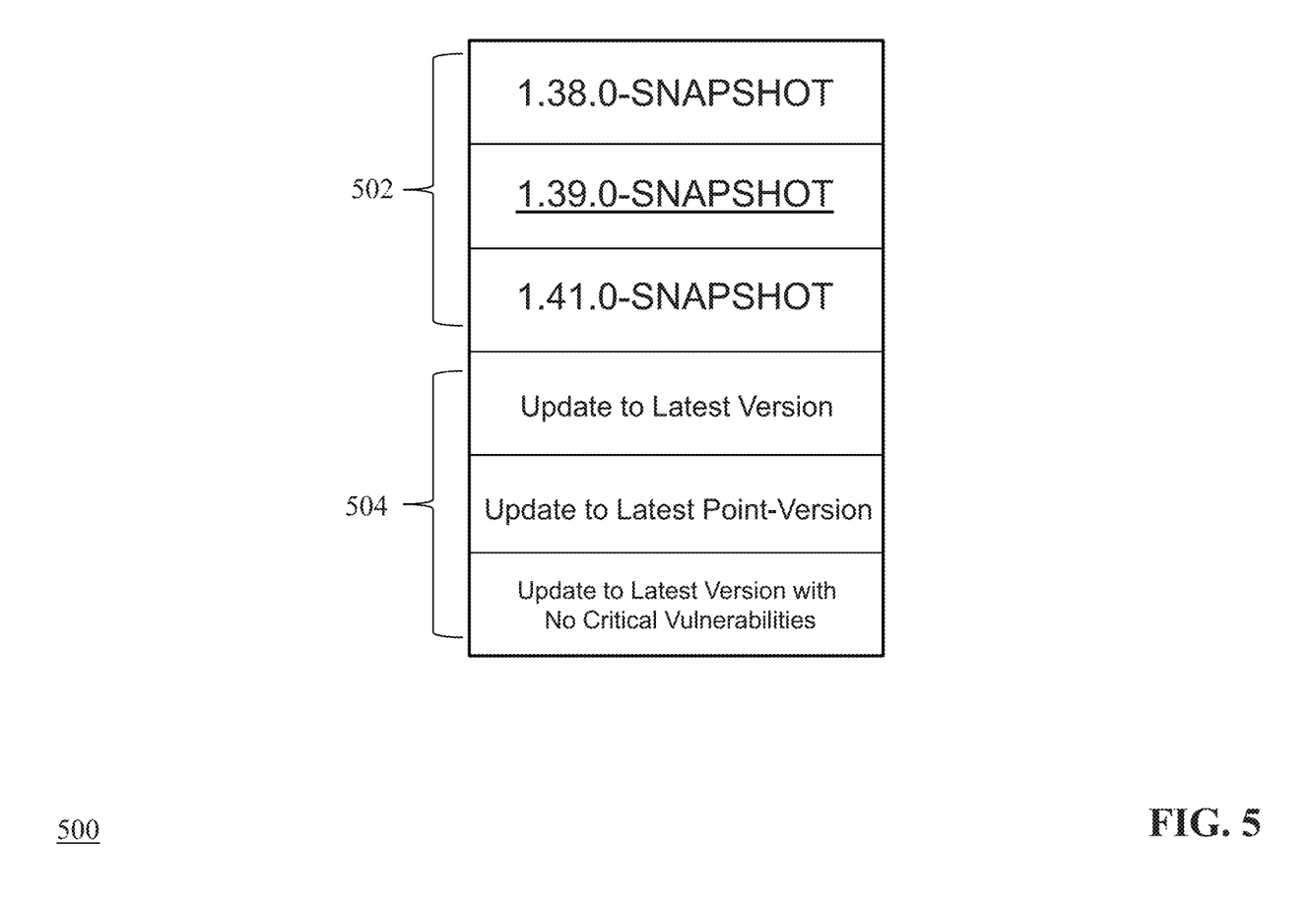
FIG. 5 is a diagram of an exemplary artifact version and scenario selection menu as generated by the UI module.

For example, the artifact 'ssc-common-dao-spring' has a current version of 1.39.0-SNAPSHOT. If the user at client device 103 wants to change or update the version of ssc-common-dao-spring in the build, the user can select the UI feature 410 for ssc-common-dao-spring and the UI module 104a presents the user with a list or drop-down menu of different versions of the library that can be integrated into the build. FIG. 5 is a diagram of an exemplary version selection menu 500 as generated by the UI module 104a. As shown in FIG. 5, when a user selects the feature 410 for a particular artifact, the UI module 104a generates a menu comprising both a list of available versions for the artifact and a list of scenario-based upgrades that can be carried out by the user. For example, the menu 500 displays a list of version upgrades for the artifact 'ssc-common-dao-spring'—specific versions 1.39.0-SNAPSHOT (current version, underlined for ease of reference by the user), 1.38.0-SNAPSHOT (earlier version), and 1.41.0-SNAPSHOT (newer version) (elements 502 in FIG. 5), along with several scenario-based version changes that do not directly specify a particular version number: Update to Latest Version, Update to Latest Point-Version, and Update to Latest Version with No Critical Vulnerabilities (elements 504 in FIG. 5). The user can select either a specific version number or one of the scenario items; for the latter, the scenario identification module 104b determines one or more scenarios that are applicable to the given artifact (and/or to the software project more generally) and includes the determined scenarios in the menu 500. Use of the scenarios advantageously relieves the burden from the user to manually identify and select the proper version number for one or more libraries in the software application build; instead the user can simply select a scenario and the scenario identification module 104b can execute an algorithm to automatically identify the library version that corresponds to the selected scenario. Other types of scenarios in addition to the above can be contemplated for use with the systems and methods described herein, e.g., roll back scenarios, and so forth.

For example, the user may not know which version of the ssc-common-dao-spring library is the latest version with no critical vulnerabilities. Instead of having to research the information independently before building and deploying a software application for testing, the user can simply select the 'Update to Latest Version with No Critical Vulnerabilities' scenario from the menu 500 and the scenario identification module 104b takes care of evaluating the library metadata from library database 108b and identifying the version number of the ssc-common-dao-spring library that satisfies the scenario. In one example, the scenario identification module 104b looks for specific metadata in the library database 108b that indicates which version(s) of a given library have no critical vulnerabilities. The library database 108b can be configured to store certain vulnerability-related information retrieved from external data sources (such as those provided by software security organizations or governmental entities—examples of such data sources are the National Vulnerability Database (NVD) maintained by the National Institute for Standards and Technology (https://nvd.nist.gov/) or the CVE Details data source maintained by MITRE Corp. (https://www.cvedetails.com/)) relating to known vulnerabilities for storage in the library database 108. The scenario identification module 104b can rely on the above information (or other information) to determine which version(s) of a library do not have critical vulnerabilities. Then, using this subset of library versions, the scenario identification module 104b can identify the latest version (e.g., using the version numbers and/or a build/release date for the library versions) that does not have any critical vulnerabilities and use that version to integrate into the application build for testing.

Turning back to FIG. 3, the user at client computing device 103 can continue down the list until all of the changed versions and/or desired version scenarios for specific libraries are selected. In some embodiments, when a user does not select a different available version or scenario (either because the user selected in 410 the same version as current, the user did not select any versions in 410, or the scenario identification module 104b determines that a scenario selected by the user results in the same version as current), the current version of the corresponding artifact is used for the software application build. In order to integrate the selected available version of the artifact into the software application build, the user can select the add-to-cart button 412 for each such artifact and instruct the UI module 104a to go to the next screen (e.g., via a button or other user interface element, not shown).

In some embodiments, the UI module 104a also displays a severity indicator 414 for each artifact that provides a color-coded indication to the user of which libraries may be in need of urgent or critical updates (due to end-of-life, security vulnerabilities, deprecation, changes to other dependencies, etc.) and which libraries are not in need of such urgent updates. For example, critical updates may be displayed in red, urgent updates may be displayed in yellow, and non-urgent updates may be displayed in green. The severity indicator can be grey or blank if the current version of the artifact is the preferred version to use. The UI module 104a can collect metadata about the artifacts from library database 108b that relate to end-of-life, security vulnerabilities, deprecation, changes to other dependencies, and the UI module 104a can convert this metadata into the color used in the severity indicator 414. The severity indicator 414 can draw the user's attention to which artifact(s) may be priorities for updating in the upcoming test build.

Turning back to FIG. 4, in some embodiments the UI module 104a includes a user interface element 416 in user interface 400 that enables a user to select an update scenario for any or all artifacts in the list. For example, the scenario options listed above in menu 500 can also be represented in element 416 for selection by the user. Instead of clicking through each available version element 410 in the interface, the user can simply select a desired scenario from element 416 and the scenario identification module 104b automatically evaluates whether a different version of each artifact in the project exists that meets the requirements of the scenario. If so, the scenario identification module 104b can select the artifact version for inclusion in the build. In some embodiments, the user can click on the Add All button 418 to automatically include all artifact versions that have changed in the interface 400 to the upcoming test build.

Turning back to FIG. 2, after receiving the library version and/or update scenario selections from the UI module 104a and/or scenario identification module 104b, the build generation module 104c identifies (step 204) a target version of one or more of the application libraries, the target version associated with a different version identifier than the current identifier. For example, the build generation module 104c can retrieve identification of specific library version numbers that will be included in the next test build from the other modules 104a-104b and/or databases 110a-110c and locate and/or retrieve the associated library versions from, e.g., databases 110a-110c and/or external data sources or feeds.

Figure 6:
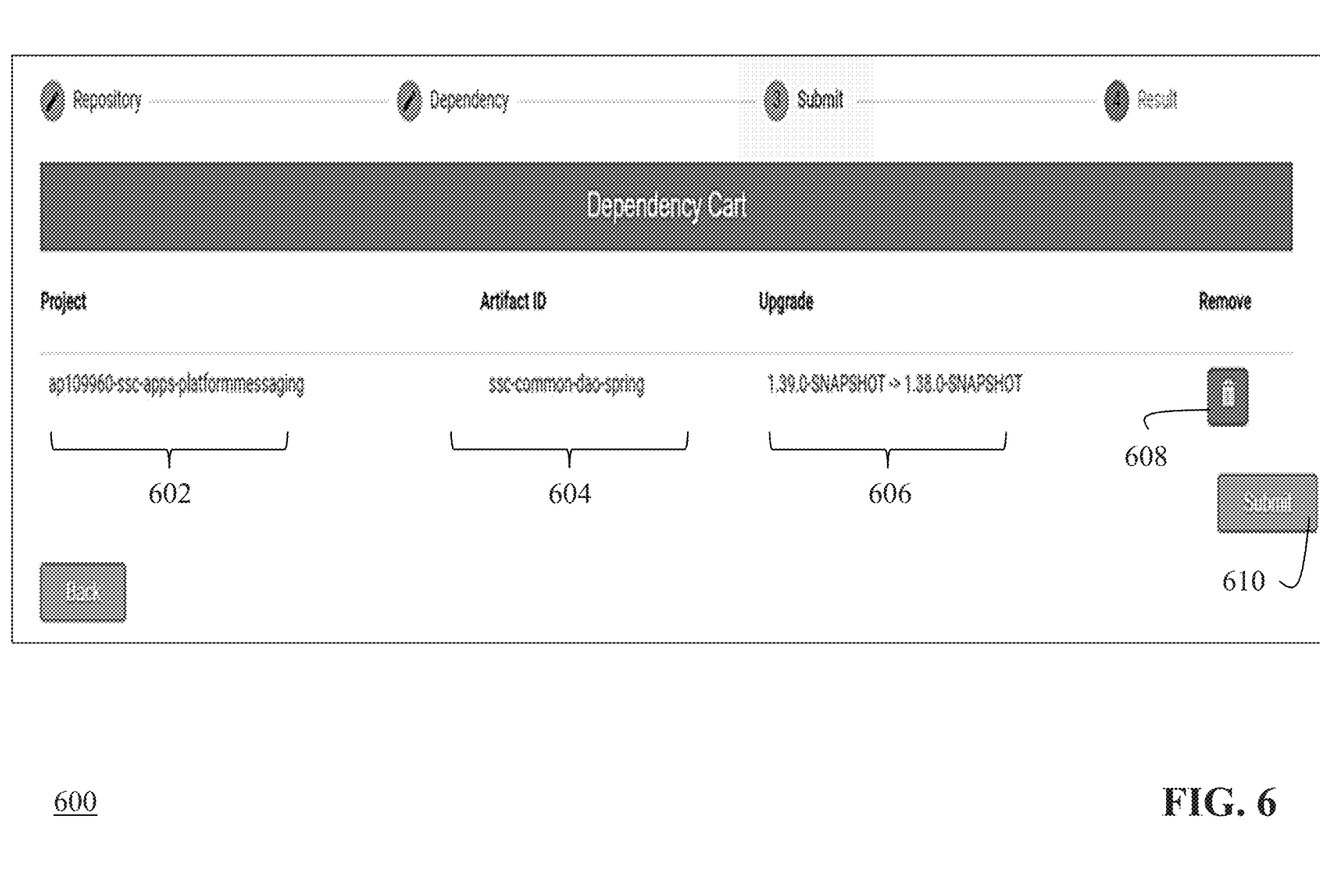
FIG. 6 is a diagram of an exemplary confirmation user interface as generated by the UI module.

In some embodiments, the UI module 104a generates a confirmation interface to enable the user at client computing device 102 to confirm that the artifact version selections chosen by the user are accurate and complete. FIG. 6 is a diagram of an exemplary confirmation interface 600 as generated by the UI module 104a. As shown in FIG. 6, the interface comprises a list of library version updates that were selected by the user, including data elements such as the project identifier/name 602, the artifact ID 604, and the version upgrade or change 606. This way, the user can quickly review and confirm the desired version changes prior to submitting them for the generation of a software build. The interface 600 also includes a button 608 for each version upgrade that enables the user to remove the upgrade from the build. Once the user is satisfied with the changes, the user can click the submit button 610 to generate a software build as described below.

Using the updated library versions, the build generation module 104c defines (step 206) a software application build for the software application incorporating the identified target versions of the application libraries, dependencies, and/or artifacts identified by the system 100 as described above. In one example, the build generation module 104c can generate build instructions for the software application using an existing build image (e.g., via cloning the build) and/or a newly-created build image and update the build image to refer to and otherwise incorporate the target library versions (instead of the currently-used versions). It should be appreciated that, in some embodiments, the build generation module 104c can generate multiple builds for a given software application that may vary in certain respects (e.g., versioning, features added, dependencies, deployment platform or device form factor, etc.) based upon the desired testing parameters and run tests against each of these builds.

In one example, at least the source code repository 110c, the library database 110b, and/or the build generation module 104c, can be part of a source code development and management platform that tracks changes in source code and other related files during the development of a software application (e.g., a Java™ application for deployment in a production computing environment), including but not limited to a source code control system and/or a version control system that is coupled to a development environment which enables users to access an application's code base to make changes (e.g., bug fixes, improved and/or additional functionality, and the like). In one embodiment, the server computing devices 102a and/or 102b are part of an Apache Maven™ deployment (https://maven.apache.org); Maven™ is a software project management tool that utilizes the concept of a project object model (POM) to manage a Java™ application build and its related dependencies. It should be appreciated that other types of software project management tools and software development platforms can be used within the scope of the invention. The source code repository 108c can store a build definition file that associates one or more source code files to a particular application build. The build generation module 108a can use the build definition file to retrieve the necessary components from the source code repository 110c or other locations—including the updated versions of the libraries—and generate one or more executable application builds for the particular software application.

As described above, an application build typically has one or more application dependencies that are required to be integrated into, linked with, or otherwise associated with the application build in order for the software application to function properly. As can be appreciated, many of the embodiments described herein relate to application libraries, but the same techniques can be applied to other application dependencies. Examples of such application dependencies include, but are not limited to, libraries, frameworks, and other types of modules that contain code, files, and/or functions. An example of an application dependency for a Java™ application is a Java™ Archive (JAR) file. These application dependencies can include open source code and/or third-party licensed code obtained from remote computing devices at build time or stored in the artifact repository 108a for use during application builds. The build definition file and/or the build generation module 104c can identify the application dependences during the process of generating the software application build and retrieve the necessary dependency components (such as updated versions of libraries) in order to complete generation of the build(s). In some embodiments, the build generation module 104c can generate an output file (e.g., POM.xml in Maven™) that stores the determined application dependencies.

Once the software application builds with the updated library versions are generated, the build generation module 104c deploys (step 208) the software application build(s) (e.g., application 104d) to the test server computing device 102b for test execution. In one example, the build generation module 104c transmits the executable application build(s) to the test server 102b and the environment provisioning module 104e analyzes the build file(s) to provision a testing environment to instantiate each application build and run tests against the build. In some embodiments, the environment provisioning module 104e can provision one or more virtual machines (e.g., in a cloud framework) on the test server 102b and/or other computing devices in the testing environment and deploy the software application build to the virtual machines. In addition, the environment provisioning module 104e can provision peripheral infrastructure needed to carry out the application tests (e.g., web servers, containers, databases, disk drives, etc.).

Once the testing environment is provisioned, the test execution module 104f executes (step 210) one or more tests of the deployed software application build(s) in the testing environment. For example, the test execution module 104f can select one or more test scripts corresponding to a test suite selected by the user at client computing device 103 and execute the test scripts against the application build(s). Execution of the test scripts can include, but is not limited to, activation of user interface elements and related functionality in the application, introduction of data into algorithms and/or workflows of the application, logging of script execution results and error messages, and so forth. The test execution module 104f captures (step 212) test execution data for one or more target versions of the application libraries in the software application build. For example, a target version of an application library may not be compatible with existing code in the software application and when invoked or executed, the library can throw error messages which are captured by the test execution module 104f. In this instance, the test execution module 104f logs these error messages and test results in a log file stored on the test server 102b.

Upon completion of the test execution, the alerting module 104g analyzes the test execution data (e.g., logs, error messages, etc.) generated by the test execution module 104f to determine whether any target versions of the application libraries were executed during the testing and if so, whether the target versions caused issues or errors in the software application. For example, the alerting module 104g can extract the relevant target library information (e.g., artifact ID, group ID, artifact name, version number, etc.) recorded in the log file and parse the library information to determine, e.g., which libraries are problematic and should not be deployed to a production computing environment as part of the application build. The alerting module 104g can then generate one or more warning messages based upon the log analysis and transmit the vulnerability warning messages to a user device (e.g., client computing device 103)—so that developers, system administrators, and other Quality Assurance staff are made aware of the invocation of the library and the related errors and if necessary, take steps to roll back the target library to a different version or avoid using the target library version in upcoming production builds. In another example, the alerting module 104f can automatically generate a library version remediation ticket in the corresponding software application development system (e.g., an issue tracking system such as Jira™ from Atlassian, Inc.) that identifies the target library version using the relevant information obtained from the log file and assigns the ticket to a developer that can adjust the library version if required.

When the test execution is complete and no issues are found with the target libraries as deployed in the application build, the build server 102a can be configured to deploy (step 216) the software application build that includes the target versions of the application libraries to a production computing environment based upon the test execution data. For example, if no errors are detected and/or only minor, non-critical errors are detected from execution of the target library versions, the build server 102a can determine that the application build using the target library versions can be safely deployed to a production computing environment. In this way, the systems and methods described herein beneficially enable automated selection of target library versions, generation of test builds using those target libraries, deployment and execution of the test builds in a test environment, determination of any errors or issues presented by the target library versions and deployment of certain application builds to a production environment when the target libraries are found to be acceptable. Developers and other users can avoid spending a significant amount of time in determining specific library versions to use; instead, the systems and methods advantageously implement algorithms to select library versions based upon library update scenarios selected by the users.

Finally, at the conclusion of the test execution process, the environment provisioning module 106e can be configured to tear down the provisioned testing environment, including any virtual machines, containers, or other resources that were generated as part of creating the test environment described above. This conserves the availability of computing resources in the test server 102b and enables other users to provision testing environments, which can be especially beneficial in a cloud-based testing framework.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for testing and deploying targeted versions of application libraries within a software application, the system comprising a computing device with a memory for storing computer-executable instructions and a processor that executes the computer-executable instructions to:
   select a software application comprising one or more application libraries each associated with a current version identifier;

identify a target version of one or more of the application libraries, the target version associated with a different version identifier than the current version identifier, comprising:
  generating one or more target version scenarios for display on a remote computing device, each target version scenario comprising a definition of which target version of an application library to include in the software application build,
  receiving a selection of one of the target version scenarios from the remote computing device, and
  retrieving, from a library database, the target version of the application library for use in the software application build based upon an attribute in the selected target version scenario;
define a software application build for the software application, the software application build incorporating the identified target versions of the application libraries;
deploy the software application build to a test computing environment;
execute one or more tests of the software application build in the test computing environment;
capture test execution data for one or more target versions of the application libraries in the software application build; and
deploy the software application build including the target versions of the application libraries to a production computing environment based upon the test execution data.

2. The system of claim 1, wherein generating one or more target version scenarios comprises:
  determining one or more common attributes for a plurality of application libraries; and
  generating the target version scenarios based upon the common attributes.

3. The system of claim 2, wherein the common attributes comprise an end of life attribute, a critical vulnerability attribute, a deprecation attribute, or a dependency attribute.

4. The system of claim 3, wherein the definition of which target version to include in the software application build comprises a latest version of the application library, a latest sub-version of the application library, or a latest version of the application library with no critical vulnerabilities.

5. The system of claim 1, wherein the test execution data comprises an error generated by one or more of the target versions of the application libraries in the software application build, a missing data value generated by one or more of the target versions of the application libraries in the software application build, or a test failure message generated by one or more of the target versions of the application libraries in the software application build.

6. The system of claim 1, wherein deploying the software application build including the target versions of the application libraries to a production computing environment based upon the test execution data comprises determining that one or more of the tests had successful execution for the software application build in the test computing environment.

7. The system of claim 1, wherein the computing device determines that one or more of the tests did not have successful execution for the software application build in the test computing environment and reverses deployment of the software application build including the target versions of the application libraries to the production computing environment.

8. The system of claim 1, wherein deploying the software application build to a test computing environment comprises provisioning the test computing environment, including initializing one or more virtual machines for execution of the software application build.

9. The system of claim 8, wherein the computing device tears down the test computing environment upon conclusion of the test execution and results capture.

10. A computerized method of testing and deploying targeted versions of application libraries within a software application, the method comprising:
  selecting, by a computing device, a software application comprising one or more application libraries each associated with a current version identifier;
  identifying, by the computing device, a target version of one or more of the application libraries, the target version associated with a different version identifier than the current version identifier, comprising:
    generating one or more target version scenarios for display on a remote computing device, each target version scenario comprising a definition of which target version of an application library to include in the software application build,
    receiving a selection of one of the target version scenarios from the remote computing device, and
    retrieving, from a library database, the target version of the application library for use in the software application build based upon an attribute in the selected target version scenario;
  defining, by the computing device, a software application build for the software application, the software application build incorporating the identified target versions of the application libraries;
  deploying, by the computing device, the software application build to a test computing environment;
  executing, by the computing device, one or more tests of the software application build in the test computing environment;
  capturing, by the computing device, test execution data for one or more target versions of the application libraries in the software application build; and
  deploying, by the computing device, the software application build including the target versions of the application libraries to a production computing environment based upon the test execution data.

11. The method of claim 10, wherein generating one or more target version scenarios comprises:
  determining one or more common attributes for a plurality of application libraries; and
  generating the target version scenarios based upon the common attributes.

12. The method of claim 11, wherein the common attributes comprise an end of life attribute, a critical vulnerability attribute, a deprecation attribute, or a dependency attribute.

13. The method of claim 12, wherein the definition of which target version to include in the software application build comprises a latest version of the application library, a latest sub-version of the application library, or a latest version of the application library with no critical vulnerabilities.

14. The method of claim 10, wherein the test execution data comprises an error generated by one or more of the target versions of the application libraries in the software application build, a missing data value generated by one or more of the target versions of the application libraries in the software application build, or a test failure message generated by one or more of the target versions of the application libraries in the software application build.

15. The method of claim 10, wherein deploying the software application build including the target versions of the application libraries to a production computing environment based upon the test execution data comprises determining that one or more of the tests had successful execution for the software application build in the test computing environment.

16. The method of claim 10, wherein the computing device determines that one or more of the tests did not have successful execution for the software application build in the test computing environment and reverses deployment of the software application build including the target versions of the application libraries to the production computing environment.

17. The method of claim 10, wherein deploying the software application build to a test computing environment comprises provisioning the test computing environment, including initializing one or more virtual machines for execution of the software application build.

18. The method of claim 17, wherein the computing device tears down the test computing environment upon conclusion of the test execution and results capture.

\* \* \* \* \*